(12) United States Patent
Lai

(10) Patent No.: US 6,366,591 B1
(45) Date of Patent: Apr. 2, 2002

(54) TECHNIQUE FOR TREATING CHANNEL IMPAIRMENTS INVOLVING MEASURING A DIGITAL LOSS IN TRANSMITTED SIGNALS IN DATA COMMUNICATIONS

(75) Inventor: Yhean-Sen Lai, Warren, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/114,541

(22) Filed: Jul. 13, 1998

(51) Int. Cl.[7] .................................................. H04J 3/12
(52) U.S. Cl. ........................................................ 370/523
(58) Field of Search ................................. 370/523, 359, 370/463, 286, 522, 292, 291, 290; 375/242, 243, 244, 354, 233, 229, 232, 222

(56) References Cited

U.S. PATENT DOCUMENTS

| | | | | |
|---|---|---|---|---|
| 5,150,379 A | * | 9/1992 | Baugh et al. | 375/14 |
| 6,002,713 A | * | 12/1999 | Goldstein et al. | 375/222 |
| 6,009,106 A | * | 12/1999 | Rustad et al. | 370/523 |
| 6,023,493 A | * | 2/2000 | Olafsson | 375/354 |
| 6,201,842 B1 | * | 3/2001 | Kim | 375/346 |
| 6,212,207 B1 | * | 4/2001 | Nicholas | 370/523 |

* cited by examiner

Primary Examiner—Chau Nguyen
Assistant Examiner—Alexander O. Boakye

(57) ABSTRACT

In a communications arrangement, a first pulse code modulation (PCM) modem communicates data in the form of PCM words with a second PCM modem through a public switched telephone network (PSTN). Transmitted signals representing PCM words may be affected by robbed bit signaling occasioned by the PSTN such that the least significant bits (LSBs) of certain transmitted PCM words are "robbed" and substituted with signaling bits. In addition, the transmitted signals are attenuated because of a digital loss imposed by a switch in the PSTN. During training of a PCM modem, any occurrence of robbed bit signaling is identified, and a signal level conversion table is created. This table contains each transmitted PCM word and the received signal level corresponding thereto. In accordance with the invention, the digital loss is measured based on those received signal levels in the table which are free of robbed bit signaling.

35 Claims, 5 Drawing Sheets

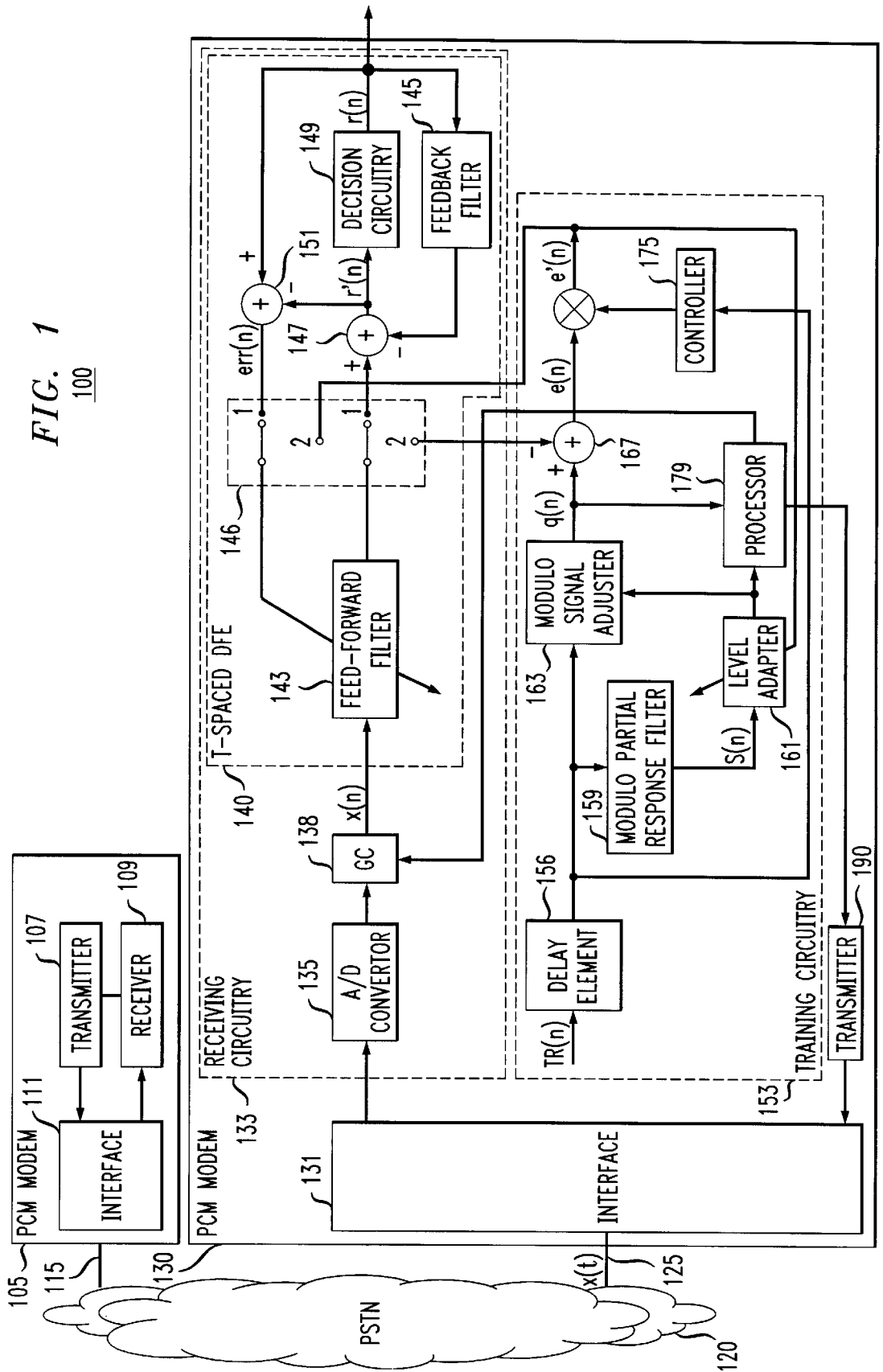

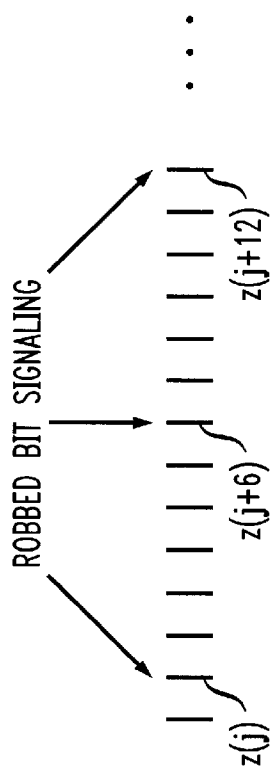

FIG. 4
400

| g \ i | 0 | 1 | 2 | 3 | 4 | 5 |
|---|---|---|---|---|---|---|
| 00 | 0 | 0 | 0 | 0 | 0 | 0 |
| 01 | 15 | 6 | 13 | 3 | 15 | 13 |
| 02 | 11 | 15 | 21 | 17 | 9 | 16 |
| 03 | 27 | 42 | 31 | 16 | 30 | 26 |
| 04 | 24 | 41 | 35 | 32 | 29 | 32 |
| 05 | 46 | 43 | 55 | 31 | 49 | 37 |
| 06 | 46 | 41 | 41 | 48 | 43 | 51 |
| 07 | 61 | 73 | 68 | 47 | 63 | 64 |
| 08 | 61 | 75 | 67 | 67 | 67 | 61 |
| 09 | 78 | 76 | 79 | 65 | 78 | 75 |
| 0A | 70 | 74 | 74 | 80 | 81 | 79 |
| 0B | 90 | 111 | 97 | 77 | 97 | 95 |
| 0C | 91 | 107 | 92 | 94 | 97 | 90 |
| 0D | 107 | 109 | 107 | 93 | 105 | 114 |
| 0E | 110 | 106 | 102 | 107 | 115 | 111 |
| 0F | 131 | 143 | 126 | 110 | 131 | 133 |
| 10 | 119 | 141 | 131 | 126 | 132 | 127 |
| ⋮ | ⋮ | ⋮ | ⋮ | ⋮ | ⋮ | ⋮ |
| 4E (403) | 3770 | 3695 | 3774 | 3769 | 3768 | 3771 |
| 4F (405) | 3902 | 4079 | 3894 | 3774 | 3901 | 3904 |
| ⋮ | ⋮ | ⋮ | ⋮ | ⋮ | ⋮ | ⋮ |
| 7F | 31946 | 31433 | 31949 | 31030 | 31974 | 31946 |

FIG. 5
500

| g \ i | 0 | 1 | 2 | 3 | 4 | 5 |
|---|---|---|---|---|---|---|
| 00 | 0 | 0 | 0 | 0 | 0 | 0 |
| 01 | 14 | 6 | 14 | 3 | 14 | 14 |
| 02 | 14 | 15 | 14 | 17 | 14 | 14 |
| 03 | 28 | 42 | 28 | 16 | 28 | 28 |
| 04 | 30 | 41 | 30 | 32 | 30 | 30 |
| 05 | 46 | 43 | 46 | 31 | 46 | 46 |
| 06 | 45 | 41 | 45 | 48 | 45 | 45 |
| 07 | 64 | 73 | 64 | 47 | 64 | 64 |
| 08 | 64 | 75 | 64 | 67 | 64 | 64 |
| 09 | 77 | 76 | 77 | 65 | 77 | 77 |
| 0A | 76 | 74 | 76 | 80 | 76 | 76 |
| 0B | 94 | 111 | 94 | 77 | 94 | 94 |
| 0C | 92 | 107 | 92 | 94 | 92 | 92 |
| 0D | 108 | 109 | 108 | 93 | 108 | 108 |
| 0E | 109 | 106 | 109 | 107 | 109 | 109 |
| 0F | 130 | 143 | 130 | 113 | 130 | 130 |
| 10 | 127 | 141 | 127 | 126 | 127 | 127 |
| ⋮ | ⋮ | ⋮ | ⋮ | ⋮ | ⋮ | ⋮ |
| 4E | 3771 | 3695 | 3771 | 3769 | 3771 | 3771 |
| 4F | 3900 | 4079 | 3900 | 3774 | 3900 | 3900 |
| ⋮ | ⋮ | ⋮ | ⋮ | ⋮ | ⋮ | ⋮ |
| 7F | 31953 | 31433 | 31953 | 31030 | 31953 | 31953 |

TECHNIQUE FOR TREATING CHANNEL IMPAIRMENTS INVOLVING MEASURING A DIGITAL LOSS IN TRANSMITTED SIGNALS IN DATA COMMUNICATIONS

FIELD OF THE INVENTION

The invention relates to communications systems and methods, and more particularly to a data communications system and method in which channel impairments are treated based on at least a measure of a digital loss in transmitted signals imposed by a switch in a central office.

BACKGROUND OF THE INVENTION

It is well known that a public switched telephone network (PSTN) comprising T1 facilities can form a basis for a virtual digital network providing 64 kb/s channels. For example, by synchronizing a pulse code modulation (PCM) modem to an 8 kHz sampling rate provided in a central office and using 8-bit PCM words for data transmission, the modem can theoretically achieve a data rate up to 64 kb/s.

However, in practice, due to power constraints and such channel impairments as echo and intersymbol interference, the highest data rate achievable by the PCM modem is about 56 kb/s. This rate may be further reduced as the central office periodically "robs" the least significant bit (LSB) of the PCM words and substitutes it with a signaling bit. As is well known, the robbed bit signaling is necessary for indicating call statuses to effect call administration in the PSTN.

To reduce echo interference in traditional voice communications, especially far echo interference due to a long-distance feedback of a voice signal through the PSTN, the level of the voice signal from the PSTN is attenuated in a central office switch before it is passed onto an analog loop connected to telephone equipment. Such attenuation by the central office switch is known as a "digital loss."

While the above robbed bit substitution does not cause significant distortion in voice communications, it causes significant degradation in data communications because of the loss of transmitted bits occasioned thereby. Similarly, while the above digital loss helps reduce the far echo interference in voice communications, it causes the levels of transmitted signals representing data to be attenuated, resulting in erroneous data recovery in data communications if the digital loss is not taken into account in the PCM modem.

Although the digital loss is built into each central office switch and the underlying attenuation factor is invariant as far as the switch is concerned, this factor may vary from one switch to another depending on its type and manufacturer. As a result, a PCM modem which is pre-adjusted during manufacture thereof to allow for the digital loss by a particular switch may not function properly when connected to a different switch in the field. In addition, an accurate measure of the actual digital loss in the field is needed in some PCM modems to properly update an echo canceller therein. Further, by knowing the actual amount of digital loss, the level of the signal to be transmitted may be boosted, in anticipation of the digital loss, to exploit the full range of the power level allowed by the analog loop, thereby increasing the signal to noise ratio of data transmission and thus accuracy of data recovery. However, a measurement of the digital loss is often ineffective as it is obscured by the robbed bit signaling, which affects the transmitted signal level from time to time.

Accordingly, there exists a need for, apart from properly treating the robbed bit signaling and the digital loss in data communications, a methodology for effectively measuring the digital loss, notwithstanding that such a measurement is obscured by the robbed bit signaling.

SUMMARY OF THE INVENTION

In accordance with the invention, a digital loss imposed by a central office switch is effectively measured using a signal level conversion table, which is created in a "level learning" process, forming part of training of a PCM modem before its operation. This table contains (a) each allowable transmitted signals representative of data which are subject to robbed bit signaling and affected by the digital loss, and (b) the received signal level corresponding thereto. In addition, any transmitted signals which are actually affected by the robbed bit signaling, and the corresponding received signals, are identified in the level learning process.

It is well known that the digital loss may cause different signal levels of transmitted signals representing different data to be attenuated to virtually the same signal level. That is, transmitted signals having different signal levels may emerge from the central office switch with virtually the same signal level because of the digital loss, even though they represent different data. As a result, the received signal levels in the signal level conversion table corresponding to different transmitted signals may be repetitive. The amount of the digital loss is a function of the number of sets of repetitive received signal levels.

In accordance with an aspect of the invention, the received signal levels which correspond to those transmitted signals unaffected by the robbed bit signaling are selected from the signal level conversion table. One or more sets of repetitive signal levels are identified from the selected received signal levels. The amount of the digital loss is determined based on the number of sets identified.

BRIEF DESCRIPTION OF THE DRAWING

In the drawing,

FIG. 1 illustrates communications arrangement in accordance with the invention;

FIG. 2 illustrates periodicity of robbed bit signaling affecting data symbols transmitted by a PCM modem in the arrangement of FIG. 1;

FIG. 3 illustrates grouping of symbols according to the periodicity of the robbed bit signaling;

FIG. 4 illustrates a first version of a signal level conversion table created using a level learning process in the arrangement of FIG. 1;

FIG. 5 illustrates a second version of the signal level conversion table; and

DETAILED DESCRIPTION

Figure 6:
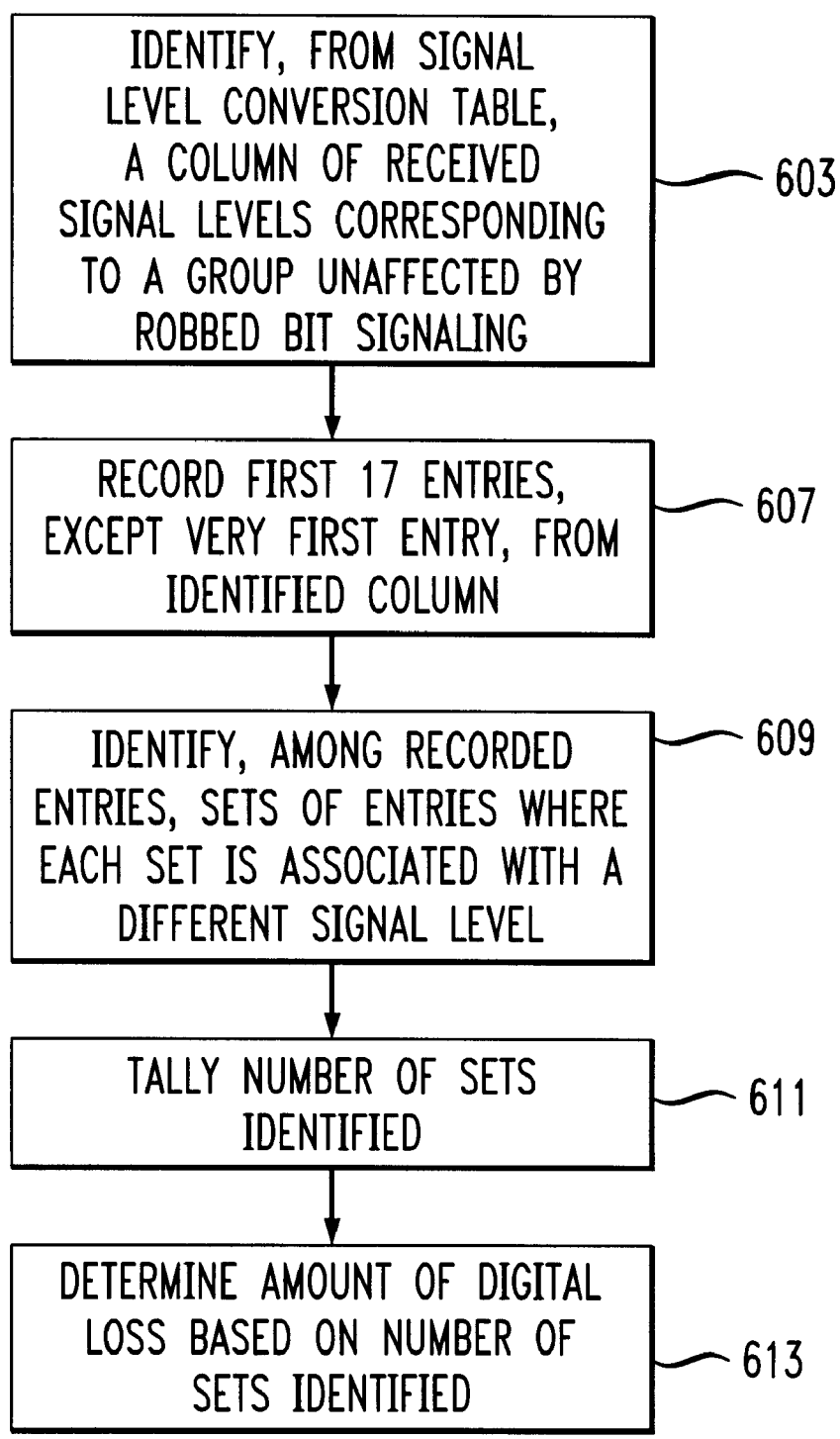
FIG. 6 is a flow chart depicting a process for measuring a digital loss in the arrangement of FIG. 1.

FIG. 1 illustrates communications arrangement 100 embodying the principles of the invention. In arrangement 100, pulse code modulation (PCM) modem 105 at a central site is connected to public switched telephone network (PSTN) 120 via T1 line 115. Modem 105 may be employed by, say, an Internet service provider, to communicate data from the Internet to PCM modem 130 at a client site. Modem 130 may initiate a dial-up connection to modem 105 to access the Internet service. This dial-up connection includes analog loop 125 connecting modem 130 to PSTN 120.

In this instance, both modems are synchronized to an 8 kHz sampling rate provided by a conventional $\mu$-law codec in a central office (not shown) in PSTN 120. The data communications between modems 105 and 130 are in the form of 8-bit PCM words, using the non-uniformly spaced quantization levels in accordance with the standard $\mu$-law companding as the signal alphabets or data symbols. Theoretically, the highest realizable rate of such data communications is 64 kb/s. However, in practice, due to power constraints and such channel impairments as echo and intersymbol interference, the highest data rate achievable here is about 56 kb/s.

In PCM modem 105, transmitter 107 illustratively transmits a signal representing Internet data through standard interface 111 to PCM modem 130 via an established dial-up connection. The transmitted signal is corrupted by channel impairments such as intersymbol interference and echo. A conventional switch (not shown) in the central office attenuates the transmitted signal before it is passed onto analog loop 125. Such attenuation by the central office switch is known as a "digital loss." The digital loss is traditionally imposed to reduce echo interference in voice communications, especially far echo interference due to a long-distance feedback of a voice signal through PSTN 120.

The attenuated transmitted signal x(t) at time t from PSTN 120 has a spectrum spanning from DC to 4 kHz on analog loop 125, and is received by standard interface 131. The received signal is then applied to A/D convertor 135 of conventional design in receiving circuitry 133. Gain control (GC) 138 imparts a gain to the digital samples resulting from the A/D conversion. At the beginning of training of modem 130, this gain is automatically determined in a well known manner to adjust the energy of the digital samples to a proper level. However, at the end of a "level learning" process to be described, which forms part of the training, the gain in question is further adjusted in response to a control signal from processor 179 described below. The gain-adjusted samples, denoted x(n), are illustratively processed by adaptive T-spaced decision feedback equalizer (DFE) 140 of conventional design, where n=t/T and T represents the symbol interval. However, it will be appreciated that a person skilled in the art will employ, instead of DFE 140 here, an adaptive fractionally-spaced (e.g., T/2-spaced) DFE. In a conventional manner, DFE 140 decides what PCM words were transmitted based on x(n), and uses past decisions to compensate for the undesirable intersymbol interference.

Specifically, DFE 140 includes feed-forward filter 143 and feedback filter 145, which may be finite impulse response (FIR) filters. Let N and K be the numbers of tap coefficients of filters 143 and 145, respectively, and $c_u$'s and $p_v$'s represent the coefficients of the respective filters, where $0 \leq u < N$ and $0 \leq v < K$. The coefficients $p_v$'s are pre-selected to achieve an impulse response of an equivalent channel based on the real channel conditions.

It should be noted at this point that modem 130 operates in two modes, namely, a training mode and an operation mode. When modem 130 is initialized, the training mode, in particular, the aforementioned level learning process, is initiated using switch 146. Otherwise, in the operation mode, which is the current mode, switch 146 is set at a first position to pass the output of feed-forward filter 143 to subtracter 147. This subtracter subtracts, from the received output, the output of feedback filter 145. The resulting difference, denoted r'(n), is provided to decision circuitry 149. The latter determines what the most likely transmitted PCM words r(n) are based on a signal level conversion table described below, taking into account line impairments including the digital loss. The decisions from circuitry 149 are provided as an input to feedback filter 145, and are also provided as an input to subtracter 151. Using r'(n) as another input, subtracter 151 evaluates an error signal err(n) as follows:

$$err(n)=r(n)-r'(n)=r(n)-[P^T(n)R(n)-C^T(n)X(n)],$$

where P(n), R(n), C(n) and X(n) are vectors, the superscript "T" denotes a standard vector transposition operation, $P^T(n)=[p_{K-1}(n)p_{K-2}(n) \ldots p_1(n)p_0(n)]$, with $p_0(n)=1$, $R^T(n)=[r(n-(K-1))r(n-(K-2)) \ldots r(n-1)r(n)]$, $C^T(n)=[c_{N-1}(n)c_{N-2}(n) \ldots c_1(n)c_0(n)]$, and $X^T(n)=[x(n-(N-1))x(n-(N-2)) \ldots x(n-1)x(n)]$.

In the current operation mode, the error signal err(n) is passed, through switch 146, onto feed-forward filter 143 to update its tap coefficients according to the following expression:

$$C(n+1)=C(n)+2\alpha err(n)X(n),$$

where $\alpha$ represents a predetermined step-size of the update.

Like a conventional PSTN, PSTN 120 implements robbed bit signaling to indicate call statuses to effect call administration therein. In robbed bit signaling, the central office in PSTN 120 robs the LSB of a transmitted symbol on each T1 channel once in every six frames. Thus, referring to FIG. 2, if the robbed bit signaling affects a $j^{th}$ PCM word (denoted z(j)) transmitted by modem 105 on a channel of T1 line 115, it equally affects every $(j+6k)^{th}$ PCM word transmitted thereby, where k is an integer. As each affected PCM word has its LSB substituted by a signaling bit, the loss of the LSB data causes significant degradation to the data transmission.

Two types of robbed bit signaling have been identified. A first one herein is referred to as "Type A" robbed bit signaling, and the other herein is referred to as "Type B" robbed bit signaling. In the type A robbed bit signaling, the LSB of the transmitted PCM word is always set to a binary value "1". For example, when modem 105 is used to communicate data represented by a PCM word "4F" (in hexadecimal) to modem 130, transmitter 107 transmits onto line 115 its $\mu$-law value, "B0," which is the complement of "4F" in accordance with the $\mu$-law companding technique. Implementing the type A robbed bit signaling, an intermediate central office in PSTN 120 transforms the transmitted word "B0" to "B1." The transformed word would be converted by a $\mu$-law codec in a central office close to modem 130 to an analog signal. Assuming no channel imperfection, A/D converter 135 in modem 130 would convert the analog signal to a digital representation of "4E," which is the complement of "B1." Thus, because of the type A robbed bit signaling, the PCM word "4F" communicated by modem 105 becomes "4E" when received at modem 130. However, it should be noted that the type A robbed bit signaling has no effect on communicated words whose LSB's="0", e.g., "4E."

On the other hand, when a transmitted PCM word affected by the type B robbed bit signaling is converted to an analog signal on analog loop 125, the signal level takes on an average value between that representing the PCM word having the LSB="1" and that representing the PCM word having the LSB="0." Thus, because of the type B robbed bit signaling, when the communicated word is "4E" or "4F," assuming no channel imperfection, A/D converter 135 would covert it to "4E" about half the times and "4F" the other half.

While the above robbed bit substitution does not cause significant distortion in voice communications, it causes significant degradation in data communications because of the loss of transmitted bits occasioned thereby. Similarly, while the above digital loss helps reduce the far echo interference in voice communications, it causes the levels of transmitted data signals to be attenuated, resulting in erroneous data recovery in data communications if the digital loss is not taken into account in PCM modem 130.

Although the digital loss is built into each central office switch and the underlying attenuation factor is invariant as far as the switch is concerned, this factor may vary from one switch to another depending on its type and manufacturer. As a result, a PCM modem which is pre-adjusted during manufacture thereof to allow for the digital loss by a particular switch may not function properly when connected to a different switch in the field. In addition, an accurate measure of the actual digital loss in the field may be needed in PCM modem 105 to properly update an echo canceller (not shown) therein. Further, by knowing the actual amount of the digital loss, the level of the signal to be transmitted may be boosted, in anticipation of the digital loss, to exploit the full range of the power level allowed by analog loop 125, thereby increasing the signal to noise ratio of data transmission and thus accuracy of data recovery. However, a measurement of the digital loss is often ineffective as it is obscured by the robbed bit signaling, which affects the transmitted signal level from time to time.

In accordance with the invention, the digital loss is effectively measured based on the aforementioned signal level conversion table, which is generated by processor 179 during the level learning process. This table contains (a) each allowable transmitted PCM word from modem 105 which is subject to robbed bit signaling and affected by the digital loss, and (b) the received signal level corresponding thereto. It is well known that the digital loss may cause different signal levels of transmitted signals representing different PCM words to be attenuated to virtually the same signal level. That is, transmitted signals having different signal levels may emerge from the central office switch with virtually the same signal level because of the digital loss, even though they represent different PCM words. As a result, the received signal levels in the signal level conversion table corresponding to different PCM words may be repetitive.

Knowing the number of repetitive signal levels in the signal level conversion table, processor 179 determines the underlying attenuation factor attributed to the digital loss. In addition, during the level learning process, any transmitted signals affected by the type A or type B robbed bit signaling, and the corresponding received signals, are identified. Advantageously, processor 179 effectively determines the attenuation factor based on the levels of those signals free of robbed bit signaling.

In accordance with the level learning process, multiple training sequences of reference signals are transmitted one by one from modem 105 to modem 130. Each training sequence TRN is of a predetermined length and includes non-spectrum shaping signals denoted TR(n). Each TRN sequence corresponds to a different possible transmitted signal level $A_g$ in absolute value, where g denotes the PCM word represented by $A_g$, and 00 (hexadecimal)$\leq g \leq$7F (hexadecimal) in this instance. This stems from the fact that each PCM word in this instance is eight bits long, with one bit indicating a sign of the transmitted signal level representing the PCM word, and the number of possible transmitted signal levels in absolute value is thus $2^7$=128 (equals 7F in hexadecimal). For example, the transmitted signal level $A_g$ with g=4E is 3772 units.

Thus, the number of TRN sequences used in the level learning process to create the signal level conversion table in this illustrative embodiment is 128, each of which corresponds to a different $A_g$. However, in practice, not every transmitted signal level is employed to transmit data. In that case, the number of TRN sequences used in the level learning process is accordingly reduced. In addition, in order to keep the transmitted power virtually constant during the level learning process, the TRN sequences are transmitted in such an order that those TRN sequences corresponding to relatively high transmitted signal levels alternate with those corresponding to relatively low transmitted signal levels.

The level learning process takes place after DFE 140 is trained in a conventional manner, and is initiated by setting switch 146 at a second position. During such a process, modem 105 transmits data based on the signals TR(n) in the current TRN sequence used to create the corresponding part of the signal level conversion table in accordance with the invention. By way of example, the number of tap coefficients of feedback filter 145, i.e., K, equals three in this instance. Accordingly, to eliminate any interference caused by previous decision outputs, the TRN sequence corresponding to the transmitted signal level $A_g$ in FIG. 3, 00$\leq g \leq$7F, is designed to include at least three zero-level signals in a row between signals of $\pm A_g$. The signs of the $\pm A_g$ signals in the TRN sequence alternate to avoid a DC offset.

It should be noted that if robbed bit signaling of type A or type B affects a first signal in the TRN sequence, every $6^{th}$ signal from that first signal in the training sequence would be equally affected. To effectively identify any affected signals, the signals TR(n) in the TRN sequence as shown in FIG. 3 are divided into six groups, i.e., groups i=0, 1, . . . 5. In this instance, group 0={TR(0) TR(6) TR(12) TR(18) TR(24) . . . }, group 1={TR(1) TR(7) TR(13) TR(19) TR(25) . . . }, group 2={TR(2) TR(8) TR(14) TR(20) TR(26) . . . }, group 3={TR(3) TR(9) TR(15) TR(21) TR(27) . . . }, group 4={TR(4) TR(10) TR(16) TR(22) TR(28) . . . }, and group 5={TR(5) TR(11) TR(17) TR(23) TR(29) . . . }. If any member of one such group is affected by type A or type B robbed bit signaling, all members in that group are equally affected.

It should also be noted that in order to have the group members equally participate in the level learning process, the TRN sequence is designed so that the non-zero signals of $\pm A_g$ are evenly distributed among the groups. For example, the TRN sequence in FIG. 3 comprises sub-sequence 303 which consists of TR(0) through TR(29), and repeats itself throughout the TRN sequence. In each sub-sequence, the non-zero signals are arranged in such a way that each non-zero signal belongs to a different one of the above-identified groups. For example, in sub-sequence 303, the non-zero signals TR(3), TR(7), TR(11), TR(16), TR(20) and TR(24) belong to groups 3, 1, 5, 4, 2 and 0, respectively.

Referring back to FIG. 1, during the level learning process, the signals TR(n) in the TRN sequence are also fed locally to delay element 156 in modem 130. Element 156 imposes a delay to the input sequence to synchronize the operations of various elements in circuitry 153. Modulo partial response filter 159 performs the grouping described above and processes the TRN sequence in groups according to the following expression:

$$S_i(n) = \sum_{m=0}^{\frac{N-\mathrm{mod}\,6\,[N]}{6}} p_{\mathrm{mod}\,6[n-i]+6m} TR(n - \mathrm{mod}\, 6[n-i] - 6m),$$

where i=0, 1, . . . , 5; mod 6 [*] denotes a standard modulo 6 operation on the argument "*" The output of filter 159, denoted vector S(n), is provided to level adapter 161, where $S^T(n)=[s_0(n)\ s_1(n)\ s_2(n)\ s_3(n)\ s_4(n)\ s_5(n)]$. Based on S(n) and another input e'(n) to be described, level adapter 161 provides weighting factors, denoted $h_i(n)$, to modulo signal adjuster 163, where i=0, 1, 2 . . . , 5. The manner in which $h_i(n)$'s are derived is fully described below. Using the received weighting factors and a delayed version of TR(n), modulo signal adjuster 163 computes an output q(n) according to the following expression:

$$q(n)=\mathrm{sign}[TR(n)](A_g+h_{\mathrm{mod}\,6[n]}\delta), \quad [1]$$

where $\delta=A_{g+1}-A_g$, and $$\mathrm{sign}[\tau] = \begin{cases} +1 & \tau > 0.0 \\ 0 & \tau = 0.0 \\ -1 & \tau < 0.0. \end{cases}$$

It should be noted that q(n) actually represents the received signal corresponding to transmitted TR(n) subject to the digital loss by the central office switch in PSTN 120. The output q(n) is provided to subtracter 167, and processor 179 to generate the signal level conversion table in accordance with the invention. Subtracter 167 also receives a signal from feed-forward filter 143 through switch 146. This signal is derived by filter 143 from the data transmission by modem 105 based on the TRN sequence. Subtracter 167 subtracts the level of the output signal of filter 143 from that of q(n) to form an error signal e(n).

Based on an input of a delayed version of TR(n), controller 175 controls the training of level adapter 161. Specifically, controller 175 performs a division $|TR(n)|/A_g$ whose quotient equals either 1 when $TR(n)=\pm A_g$ or zero when TR(n)=0. The error signal e(n) is multiplied by the output of controller 175 using multiplier 173 to ensure that adapter 161 is only trained with a non-zero TR(n). The resulting product denoted e'(n) is applied through switch 146 to filter 143 to adapt its filter coefficients in a conventional manner. As mentioned before, e'(n) is also applied to level adapter 161. Based on e'(n), and S(n) from modulo partial response filter 159, level adapter 161 updates the aforementioned weighting factors $h_i(n)$, i=0, 1, . . . 5, as follows:

$$H(n)=H(n)-2\beta e'(n)S(n), \quad [2]$$

where $H^T(n)=[h_0(n)\ h_1(n)\ h_2(n)\ h_3(n)\ h_4(n)\ h_5(n)]$, and β is the step-size of the update. Before training level adapter 161 with each TRN sequence, the weighting factors thereof are each initialized to be 0.0. The weighting factors are then updated according to expression [2].

It can be shown that if a particular transmitted training data group i=I, 0≦I≦5, is affected by the type B robbed bit signaling, the absolute value of the corresponding $h_I(n)$ from expression [2] would be close to 0.5. In addition, if a particular transmitted training data group i=I', 0≦I'≦5, is affected by the type A robbed bit signaling, the corresponding $h_{I'}(n)$ from expression (2) would be close to −1.0. It should be noted that group I' here is not limited to only one group but generically represents one or more groups affected by the type A robbed bit signaling. For other groups which are not affected by robbed bit signaling, the corresponding $h_i(n)$, i≠I or I', would be close to 0.0.

After each of groups I and/or I' is identified, processor 179 communicates to modem 105 through transmitter 190 the allowable PCM words, especially those to be transmitted by modem 105 during the $n^{th}$ symbol interval with mod 6 [n]=I or I' corresponding to group I or I', which can be transmitted by modem 105 and properly recovered in modem 130 despite the type B and/or type A robbed bit signaling. In operation, transmitter 107 uses such allowable PCM words for transmitting data.

As mentioned before, processor 179 generates the signal level conversion table in accordance with the invention based on q(n), which represents the version of TR(n) received at decision circuitry 149, and incorporates the effect of the digital loss caused by the central office switch in PSTN 120. FIG. 4 illustrates signal level conversion table 400 created by processor 179 after the training of modem 130 with the 128 TRN sequences each corresponding to a different $A_g$, 00≦g≦7F.

As illustrated, table 400 contains 128 rows and 6 columns. Each row corresponds to a different g or PCM word, and each column corresponds to a different group i, 0≦i≦5. A table entry in row g and column i represents the average received signal level corresponding to the transmitted signal which represents g and belongs to the group i. Processor 179 forms the table entry by (a) collecting the q(n) signals corresponding to the non-zero TR(n) signals in group i in the TRN sequence containing $\pm A_g$, and (b) low-pass filtering the collected q(n) signals in group i to reduce noise therein. In effect, the table entry represents an average of the collected q(n) signals in group i. For example, row 403 lists the average received signal levels for the transmitted signals representing "4E" in the respective groups.

Based on the H(n) from expression [2], processor 179 determines that in this instance the transmitted signals in group i=1 are affected by the type B robbed bit signaling, indicated by the irregular values of the group 1 entries in both rows 403 (g=4E) and 405 (g=4F) with respect to those of other entries in the respective rows. Similarly, processor 179 determines that in this instance the transmitted signals in group i=3 are affected by the type A robbed bit signaling, indicated by the irregular value of the group 3 entry in row 405, but not row 403, with respect to those of the other entries, except the group 1 entry, in the same row.

After identifying those groups (i.e., i=1 and 3) affected by robbed bit signaling, processor 179 based on table 400 creates a second version of the signal level conversion table, denoted 500 in FIG. 5. As shown in FIG. 5, the entries of each row in table 500 which belong to those groups (i.e., i=0, 2, 4 and 5) unaffected by robbed bit signaling take on the average value of the corresponding entries in table 400 to further reduce noise therein. For example, the group i=0, 2, 4 and 5 entries in row 503 of table 500 each take on the average value (3771) of the corresponding entries (3770, 3774, 3768 and 3771) in row 403 of table 400.

Similarly, the entries of each row in table 500 which belong to those groups affected by the type A robbed bit signaling take on the average value of the corresponding entries in table 400. Since in this instance there is only group i=3 affected by the type A robbed bit signaling, the corresponding entries in group 3 in tables 400 and 500 are identical. For the same reason, the corresponding entries in group i=1 (affected by type B robbed bit signaling) in tables 400 and 500 are identical.

Table 500 is provided as the aforementioned signal level conversion table to decision circuitry 149 for it to determine what the most likely transmitted PCM words are, given the received signals, after modem 130 is put in the operation mode. For each received signal corresponding to a group, decision circuitry 149 searches table 500 for the most likely transmitted PCM word in the column corresponding to that group.

In accordance with the invention, processor 179 measures the digital loss also based on table 500. To that end, processor 179 identifies from table 500 a column of received signal levels corresponding to a group, for example, group i=0, which is unaffected by the type A or, type B robbed bit signaling, as indicated at step 603 in FIG. 6. At step 607, processor 179 records the first 17 entries, except the very first entry corresponding to g=00, from the identified column. In other words, what processor 179 records is the 16 entries corresponding to g=01 through 10 (hexadecimal) from the identified column. Processor 179 then at step 609 identifies, among the recorded entries, sets of entries where each set is associated with a different signal level. Specifically, processor 179 assigns each recorded entry to one of the sets according to its signal level. Each set contains one or more entries whose signal levels are not necessarily identical but close to one another within a predetermined tolerance, e.g., 4 units in this instance. At step 611, processor 179 tallies the number of sets associated with different signal levels. In this example, the sets associated with different signal levels to which the recorded 16 group 0 entries are assigned are: (a) set 507 containing two entries whose signal levels are 14 and 14, respectively, (b) set 509 containing two entries whose signal levels are 28 and 30, respectively, (c) set 511 containing two entries whose signal levels are 46 and 45, respectively, (d) set 513 containing two entries whose signal levels are 64 and 64, respectively, (d) set 515 containing two entries whose signal levels are 77 and 76, respectively, (f) set 517 containing two entries whose signal levels are 94 and 92, respectively, (g) set 519 containing two entries whose signal levels 108 and 109, respectively, and (h) set 521 containing two entries whose signal levels are 130 and 127, respectively.

At step 613, processor 179 determines the amount of digital loss based on the number of sets identified above, which is 8 in this instance, in accordance with the $$\Gamma = 16 \times 10^{-\frac{DL}{20}}, \quad [3]$$

where $\Gamma$ represents the number of sets associated with different signal levels in question; and DL represents the digital loss in dB.

Continuing the above example, by plugging in $\Gamma=8$ in [3], DL=6 dB. Processor 179 may then communicate through transmitter 190 the digital loss amount to modem 105 to, as mentioned before, update the echo canceller therein. In addition, knowing the amount of the digital loss, processor 179 may transmit to modem 105 a request for boosting the transmitted signal level by a predetermined amount, say, 6 dB, to anticipate the digital loss imposed by the central office switch. Accordingly, the resulting signal to noise ratio of x(t) on analog loop 125 increases, thereby improving the accuracy of data recovery. In that case, processor 179 also transmits a control signal to gain control 138 to reduce the gain afforded thereby by 6 dB. As a result, table 500 remains usable by circuitry 149 to determine the most likely transmitted PCM words.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, communications arrangement 100 disclosed herein uses T1 facilities which are common in the United States. However, the invention is equally applicable in other countries such as European countries where E1 facilities instead of the T1 facilities are used, and where A-law companding instead of $\mu$-law companding controls.

Finally, communications arrangement 100 disclosed herein is in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

I claim:

1. Apparatus for recovering signals transmitted through a communication network, the transmitted signals being subject to robbed bit signaling and affected by a digital loss incurred in the communication network, the apparatus comprising:

an interface for receiving signals corresponding to the transmitted signals;

circuitry for recovering the transmitted signals based on the received signals, ones of the received signals which correspond to those transmitted signals unaffected by the robbed bit signaling being selected;

a mechanism for identifying at least one set of signal levels of the selected received signals based on values of the signal levels; and a processor for determining an amount of the digital loss based on the number of sets in the at least one set.

2. The apparatus of claim 1 wherein the robbed bit signaling includes type A robbed bit signaling.

3. The apparatus of claim 1 wherein the robbed bit signaling includes type B robbed bit signaling.

4. The apparatus of claim 1 wherein the received signals are classified in a plurality of groups according to periodicity of the robbed bit signaling.

5. The apparatus of claim 4 wherein the selected received signals belong to one of the plurality of groups.

6. The apparatus of claim 1 wherein values of the signal levels in each set are close to each other within a predetermined threshold.

7. The apparatus of claim 1 wherein the signals represent pulse code modulation (PCM) words.

8. The apparatus of claim 1 wherein signal levels of the transmitted signals vary with the amount of the digital loss.

9. A communications system comprising:

An interface for receiving training signals transmitted through a communication network, the transmitted training signals being subject to robbed bit signaling and affected by a digital loss incurred in the communication network, the training signals representing data, ones of the received training signals which correspond to those transmitted training signals unaffected by the robbed bit signaling and represent different data being selected;

a mechanism for identifying at least one set of signal levels of the selected received training signals based on values of the signal levels; and a processor for determining an amount of the digital loss based on the number of sets in the at least one set.

10. The system of claim 9 wherein the communication network includes a public switched telephone network (PSTN).

11. The system of claim 9 wherein the training signals are arranged in a plurality of sequences, each sequence being associated with different data.

12. The system of claim 11 wherein each sequence includes non-zero training signals.

13. The system of claim 12 wherein signs of the non-zero training signals in each sequence alternate along the sequence.

14. The system of claim 12 wherein each sequence of training signals includes sub-sequences of training signals.

15. The system of claim 14 wherein each sub-sequence is identical.

16. The system of claim 14 further comprising a clock mechanism for defining a plurality time slots, the time slots being classified in different groups according to periodicity of the robbed bit signaling, wherein those non-zero training signals which are in at least one of the sub-sequences in the sequence occupy selected time slots, each of the selected time slots being in a different group.

17. The system of claim 16 wherein the number of different groups is six.

18. The system of claim 9 wherein the data is in the form of PCM words.

19. A method for recovering signals transmitted through a communication network, the transmitted signals being subject to robbed bit signaling and affected by a digital loss incurred in the communication network, the method comprising:

receiving signals corresponding to the transmitted signals;

recovering the transmitted signals based on the received signals;

selecting ones of the received signals which correspond to those transmitted signals unaffected by the robbed bit signaling;

identifying at least one set of signal levels of the selected received signals based on values of the signal levels; and determining an amount of the digital loss based on the number of sets in the at least one set.

20. The method of claim 19 wherein the robbed bit signaling includes type A robbed bit signaling.

21. The method of claim 19 wherein the robbed bit signaling includes type B robbed bit signaling.

22. The method of claim 19 wherein the received signals are classified in a plurality of groups according to periodicity of the robbed bit signaling.

23. The method of claim 22 wherein the selected received signals belong to one of the plurality of groups.

24. The method of claim 19 wherein values of the signal levels in each set are close to each other within a predetermined threshold.

25. The method of claim 19 wherein the signals represent PCM words.

26. The method of claim 19 wherein signal levels of the transmitted signals vary with the amount of the digital loss.

27. A communications method comprising:

receiving training signals transmitted through a communication network, the transmitted training signals being subject to robbed bit signaling and affected by a digital loss incurred in the communication network, the training signals representing data;

selecting ones of the received training signals which correspond to those transmitted training signals unaffected by the robbed bit signaling and represent different data;

identifying at least one set of signal levels of the selected received training signals based on values of the signal levels; and determining an amount of the digital loss based on the number of sets in the at least one set.

28. The method of claim 27 wherein the training signals are arranged in a plurality of sequences, each sequence being associated with different data.

29. The method of claim 28 wherein each sequence includes non-zero training signals.

30. The method of claim 29 wherein signs of the non-zero training signals in each sequence alternate along the sequence.

31. The method of claim 29 wherein each sequence of training signals includes sub-sequences of training signals.

32. The method of claim 31 wherein each sub-sequence is identical.

33. The method of claim 31 further comprising defining a plurality time slots, the time slots being classified in different groups according to periodicity of the robbed bit signaling, wherein those non-zero training signals which are in at least one of the sub-sequences in the sequence occupy selected time slots, each of the selected time slots being in a different group.

34. The method of claim 33 wherein the number of different groups is six.

35. The method of claim 27 wherein the data is in the form of PCM words.

* * * * *